July 14, 1953     A. R. WILLSON ET AL     2,645,728
ELECTRICAL VIBRATORY APPARATUS
Filed June 5, 1951     2 Sheets-Sheet 1

Inventors
Abner R. Willson
Donald W. Nelson
By their attorneys
Howson and Howson

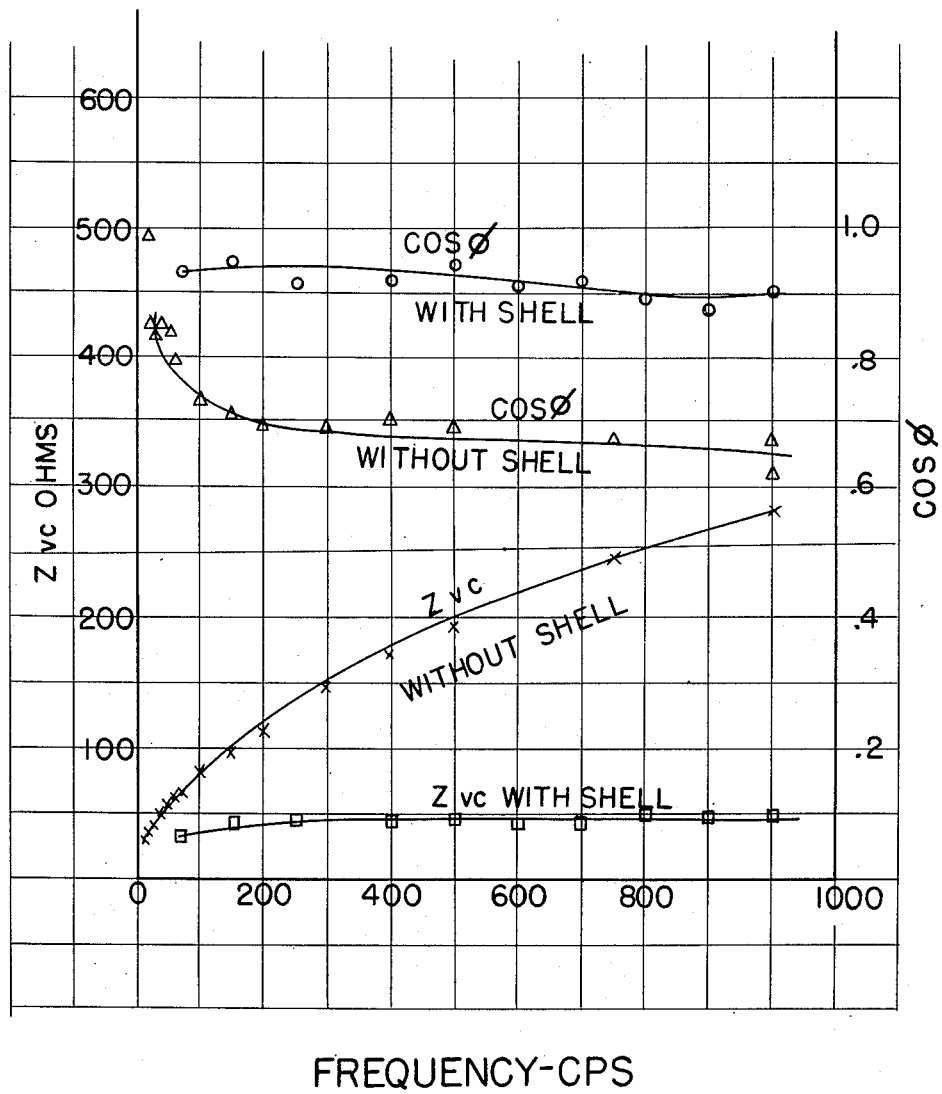

Patented July 14, 1953

2,645,728

UNITED STATES PATENT OFFICE 2,645,728

ELECTRICAL VIBRATORY APPARATUS

Abner R. Willson and Donald W. Nelson, Seattle, Wash., assignors to The MB Manufacturing Company, Inc., New Haven, Conn., a corporation of Connecticut Application June 5, 1951, Serial No. 230,064

7 Claims. (Cl. 310—27)

This application pertains to electrical vibratory apparatus and in particular to a driver coil shell for such apparatus by means of which higher efficiencies can be obtained therefrom.

The present invention is applicable to many kinds of vibratory apparatus, including loudspeakers, but it is particularly useful in connection with electrical vibration exciters of the type used to test the effects of vibration on structures such as airplane wings and airframe members, and for conducting vibration tests in accordance with government specifications.

In former years test specifications for such structures were based on a vibration frequency range of from 10 to 55 cps. Vibrations of these frequencies can be generated easily and cheaply by mechanical means. Recently, however, specifications have required testing at high frequencies, e. g., 500 cps. and in some cases at over 3000 cps., and also at very low frequencies in the neighborhood of one cps. Such frequencies cannot conveniently be obtained by mechanical means, for several reasons. For instance, large rotating unbalances are required in mechanical shakers of the unbalanced type in order to produce forces at very low R. P. M., requiring that the weight of the added mechanical shaker be comparable or greater than the generated force. The addition of large weights many times distorts the form of the natural mode under investigation. Moreover, mechanical vibrators are difficult and sluggish to adjust with regard to frequency and force, and they have a tendency to "slide off" resonance.

It has been recognized for a long time that high frequency and extremely low frequency vibrations can be obtained by electrically energized vibration exciters. However, because their efficiency declines sharply at higher frequencies, the output from such exciters has been limited by their relatively large power requirements and their use has been limited for that reason.

The present invention provides a means whereby electrical vibration exciters can be operated at high frequencies, i. e., over 100 cps., with little increase in driving power at a given force output.

According to the invention, the driver coil of the exciter which normally carries an alternating current of variable frequency is enclosed in a conductive, non-magnetizable shell. This shell acts to reduce the impedance of the driver coil winding by transformer action, the shell being a short-circuited secondary turn of low resistance and inductance. In addition, the shell acts to eliminate magnetic disturbances set up by the alternating current flowing through the driver coil external to the vibration exciter, which disturbances had in many cases interfered with the normal operation of test specimens sensitive to magnetic disturbances.

In the drawings:

Fig. 5 is a graph showing the variation of impedance and power factor with frequency in a known vibration exciter and in one made according to the invention.

Figure 1:
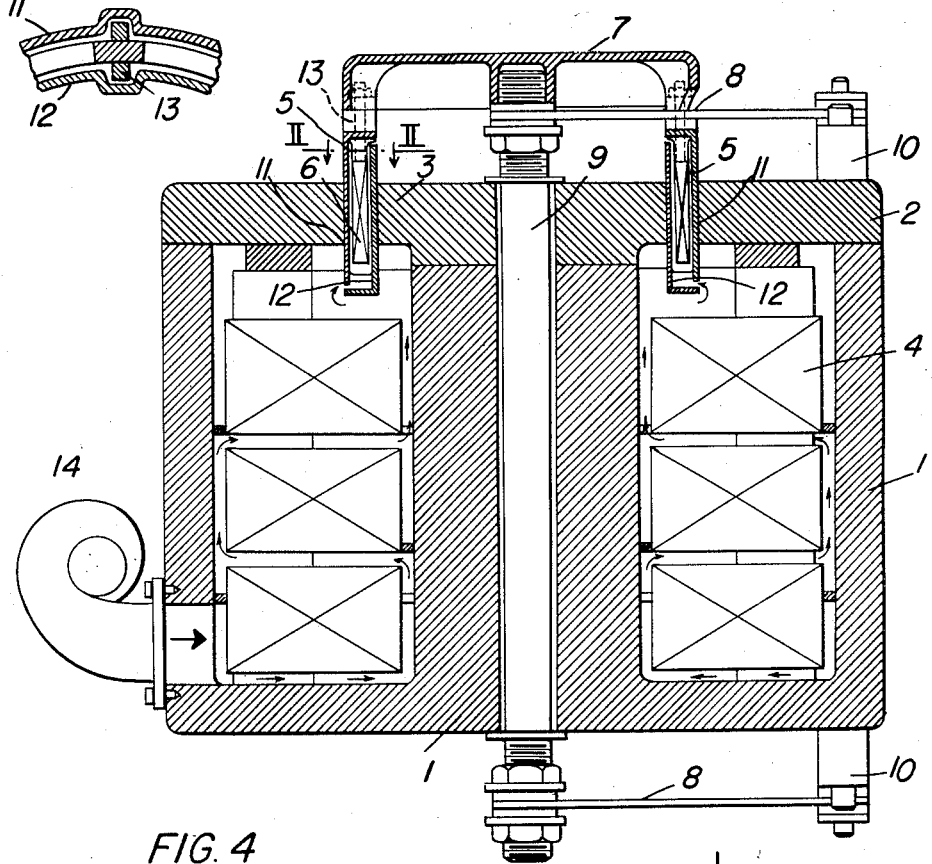
Fig. 1 is a vertical section of a vibration exciter built according to the invention.
Figure 4:
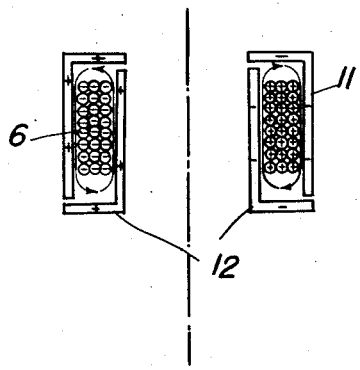
Fig. 4 is a view of an enlarged driver coil enclosed in a shell according to the invention, wherein the flux due to the current in the driver coil is contained within the shell.

Referring to Fig. 1, a vibration exciter according to the invention may have a main magnetic structure comprising a body 1, an annular cover plate 2, a core plate 3, and a field coil 4. As will be seen from Fig. 1, the core plate 3 fits inside the annular cover plate 2 leaving a gap, indicated generally as 5, across which magnetic flux generated by the field coil 4 can flow.

For directly causing the vibratory motion desired, a cylindrical driver coil 6 is placed in gap 5 concentric with core plate 3. Coil 6 is made somewhat longer axially than the width of the magnetic structure so that fringe magnetic flux will pass through the coil. This coil is attached to a moving table 7 by means of clamp connectors 13 which encircle the coil.

Flat leaf springs 8 center the table 7 and attached coil 6 in the annular gap 5. A connecting rod 9 through the center of body 1 and core plate 3 joins the two leaf springs 8. The springs are supported on their outer ends by blocks 10. A blower 14 may be provided for cooling coil 4.

The exciter apparatus so far described is a type familiar to the industry. According to the invention it is modified by the provision of a conductive shell formed by two continuous bands of copper 11 and 12, rigidly attached to cover plate 2 and core plate 3, respectively. These bands may be arranged substantially completely to enclose driving coil 6. As shown best in Fig. 2, the bands 11 and 12 are shaped to accommodate the connector 13 encircling the coil 6. Holes (not shown) are also provided in the upper surface of band 11 to permit the connectors to join table 7.

As will be noted, the horizontal wall of band 11 does not quite meet the vertical wall of band 12, nor does the horizontal wall of band 12 meet the vertical wall of band 11. The resultant slits provide passage for the circulation of air from blower 14, with resultant cooling of coil 6.

Figure 2:
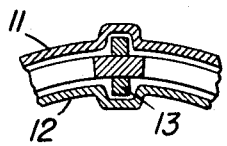
Fig. 2 is a horizontal section taken on the line II—II of Fig. 1 showing details of mounting the driver coil according to the invention.

The operation of the exciter shown in Figs. 1 and 2 is as follows: A direct current is passed through field coil 4 producing a magnetic flux through core plate 3, air gap 5, and cover plate 2. The path of the flux is coaxially with rod 9, then generally radially through the core plate 3 across air gap 5, through the cover plate 2, still radially, then down the outer cylindrical portion of the body 1, and then radially through the bottom of the body 1. It will be obvious that the direction of the flux can be reversed by reversing the polarity of the field coil 4. An alternating current is passed through driver coil 6. The resulting force causes a reciprocating motion or vibration of coil 6 and table 7, the frequency depending on the frequency of the exciting current in coil 6. From table 7 the vibration may be transmitted to the test specimen as desired.

Figure 3:
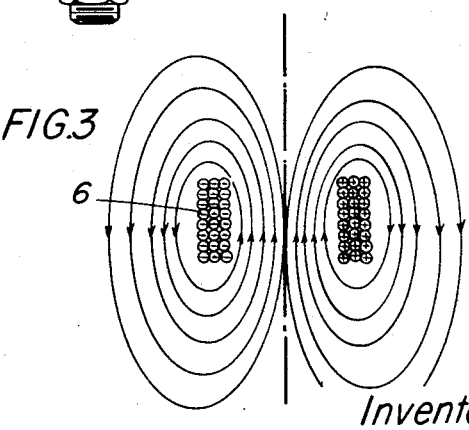
Fig. 3 is a diagrammatic view showing a driver coil without the novel shell and illustrating the magnetic flux about the driver coil in air due to a current in the coil.

With vibration exciters presently known to the art, not having shells similar to that formed by bands 11 and 12, when a high frequency alternating current is passed through coil 6 and the coil commerces reciprocatory motion, the impedance of the driver coil increases in value approximately directly proportional to frequency. This means for a given output force through the frequency range, the driving power increases with frequency both in volt-amperes and watts. Moreover, with the vibration exciters presently known to the art, a current passed through driver coil 6 in the manner just described would set up a flux pattern around the exciter coil, similar to that shown in Fig. 3, the direction of the flux changing with alternation of the driver coil current. The flux so set up would be transverse to the main radial air gap flux set up by coil 4 and extending out into the surrounding air as well as into the core plate 3 and cover plate 2. The magnitude of the flux from the driver coil increases with increase in driver coil current. The losses in the iron parts, core plate 3 and cover plate 2, increase from this disturbance with increase in driver coil current and frequency.

When, however, a shell such as the copper enclosure formed by bands 11 and 12 is set up around coil 6, the induced currents in the shell counteract the currents of the driver coil itself external to the shell, minimizing the disturbance. external to the shell. This, along with the transformer action between the shell and the driver coil, results in an impedance of the driver coil which is reduced compared to that with no shell above 100 cps. The reduction in the inductive component of the impedance requires less volt-amperes for a given generated force. A reduction of the impedance means less power loss for a given generated force. Thus, in the novel exciter the impedance of coil 6 is not greatly affected by increasing frequency and hence the efficiency of the exciter remains relatively constant with increasing frequency. Moreover, an essentially constant power factor approaching unity is obtained (see Fig. 5). A relatively constant impedance with good power factor is highly desirable when electronic type amplifiers are used to supply power to the driving coil.

Moreover, when a shell such as the copper enclosure around exciter coil 6 is set up as indicated in Fig. 1, the effects of the alternating currents in the exciter coil 6, external of the enclosure, are nullified and flux disturbances caused by these currents disappear. This in turn results in increased efficiency by requiring less driving power to be supplied to coil 6 and cooler operation of the iron in the magnetic circuits.

Moreover, heating of table 7 is reduced, which may be important with certain types of test specimens. Also the possibility of vibration pickups being adversely affected by the alternating flux disturbances is minimized. Finally, the copper shell serves as a protective cover and keeps particles of dirt and metal from being attracted into the small clearances between the moving coil and surrounding structure.

It will be understood that many variations may be made in the invention. The bands, for example, need not be made of copper, but of any conductive material which cannot be magnetized. The enclosure, shell or band may be solid in cross-section or open in cross-section, such for example as would be obtained by having a number of turns of wire. The bands need not enclose the exciter coil as completely as do the ones illustrated, although generally, the more complete the enclosure, the more effective the screening action. In practice we have found that a conducting band placed only on the periphery of the core plate 3 which is oriented on the inside diameter of driver coil 6 gives a considerable improvement without the complication of a complete enclosure.

Moreover, the invention is applicable not only to test apparatus of the type described, but also to loudspeakers and other similar types of equipment.

What is claimed is:

1. In an electrical vibratory apparatus, the combination of a coil carrying an alternating current and adapted to move with reciprocating motion in an electromagnetic field substantially constant in magnitude and direction, and a conductive, non-magnetizable shell in said electromagnetic field adjacent said coil, said coil being movable relative to said shell, whereby the impedance of said coil and the external magnetic effects of the alternating current flowing through said coil are reduced.

2. In an electrical vibratory apparatus, a core, a field coil fixed relative to said core and carrying a direct current and a driver coil carrying an alternating curent, said driver coil being adapted to move with reciprocating motion in the electromagnetic field generated by said field coil, in combination with a conductive, non-magnetizable shell about said driver coil and fixed to said core, whereby the impedance of said driver coil and the external magnetic effects of the alternating current in said driver coil are reduced.

3. In an electrical vibration exciter, a core having an air gap, a field coil carrying a direct current and adapted to set up a magnetic flux in said core, said flux traversing said air gap, and a driver coil in said flux traversing said air gap, said driver coil carrying an alternating current, being movable relative to said core, and having its axis transverse to the lines of magnetic flux set up by said field coil in said air gap, in combination with a conductive, non-magnetizable shell in said air gap adjacent said driver coil and fixed to said core, whereby the impedance of said driver coil and the external magnetic effects of the alternating current in said driver coil are reduced.

4. In an electrical vibration exciter, a core having an air gap, a field coil carrying a direct current and adapted to set up a magnetic flux in said core, said flux traversing said air gap, a driver coil in said flux traversing said air gap, said driver coil carrying an alternating current, being movable relative to said core, and having its axis transverse to the lines of magnetic flux set up by said field coil in said air gap, and a table joined to said driver coil and movable with said driver coil independently of said field coil, in combination with a conductive, non-magnetizable shell about said driver coil and fixed to said core, whereby the impedance of said driver coil and the external magnetic effects of the alternating current in said driver coil are reduced.

5. Apparatus as claimed in claim 3 wherein said shell comprises a band.

6. Apparatus as claimed in claim 5 wherein said shell comprises a substantially cylindrical band concentric with and of lesser diameter than the inner diameter of said driving coil.

7. Apparatus as claimed in claim 3 wherein said shell substantially encloses said driver coil.

ABNER R. WILLSON.
DONALD W. NELSON.

References Cited in the file of this patent

UNITED STATES PATENTS

| Number | Name | Date |
|---|---|---|
| 387,310 | Mather | Aug. 7, 1888 |
| 2,495,858 | Marti | Jan. 31, 1950 |